United States Patent [19]

Mateos et al.

[11] Patent Number: 4,807,094

[45] Date of Patent: Feb. 21, 1989

[54] HEADLAMP ASSEMBLY

[75] Inventors: Luis A. Mateos; Lawrence M. Rice, both of Anderson, Ind.

[73] Assignee: General Motors Corporation, Detroit, Mich.

[21] Appl. No.: 135,942

[22] Filed: Dec. 21, 1987

[51] Int. Cl.[4] .................... B60Q 1/00

[52] U.S. Cl. .................... 362/80; 362/290; 362/342; 296/194

[58] Field of Search .................... 362/61, 80, 82, 290, 362/342, 268, 296, 299, 237, 245, 307, 327, 329; 296/1 R, 194; D26/28, 35

[56] References Cited

U.S. PATENT DOCUMENTS

| | | | |
|---|---|---|---|
| 1,463,024 | 7/1923 | Steinhauer et al. | 362/290 |
| 3,487,206 | 12/1969 | Dawson et al. | 362/80 |
| 4,153,928 | 5/1979 | Speedy | 362/80 |
| 4,383,290 | 5/1983 | Binder et al. | 362/80 |
| 4,525,772 | 6/1985 | Peck | 362/290 |
| 4,722,033 | 1/1988 | Van Duyn et al. | 362/80 |

FOREIGN PATENT DOCUMENTS

| | | | |
|---|---|---|---|
| 0074726 | 3/1983 | European Pat. Off. | 362/268 |
| 2129537 | 5/1984 | United Kingdom | 362/61 |

*Primary Examiner*—Ira S. Lazarus
*Assistant Examiner*—D. M. Cox
*Attorney, Agent, or Firm*—Edward J. Biskup

[57] ABSTRACT

A headlamp assembly having a colorless lens which is positioned flush with the adjacent panels at the front end of a motor vehicle and which includes horizontal louvre and vertical slat means located within the body of the headlamp that art of the same color as the adjacent panels and are positioned and spaced therein so that the lens appears to be the same color as the adjacent panels.

9 Claims, 3 Drawing Sheets

HEADLAMP ASSEMBLY

This invention concerns headlamps in general and more particularly relates to a headlamp assembly which when unlighted has the lens thereof appear to be of the same color as the adjacent panels at the front end of the vehicle.

For years, motor vehicle stylists have looked for various ways of concealing the headlamps of a motor vehicle so that the front end of the vehicle has an uninterrupted, uniform appearance and also to streamline the airflow over the vehicle. One preferred solution has been to provide retractable type headlamp systems which include a motor driven mechanism that rotates the headlamp from an exposed position wherein the light can be projected forwardly when lit to a retracted position wherein the headlamp is concealed within the body of the vehicle. A cover is normally incorporated with the retractable headlamp system so when the latter assumes the retracted position, the opening in which the headlamp is located is closed by the cover to provide the uninterrupted, uniform, front end appearance referred to above.

Although the retractable type headlamp systems provide the front end appearance desired by stylists, it should be apparent that the added mechanism for retracting the headlamp increases the cost of the headlamp system and, accordingly, the cost of the vehicle, so that in most cases, this form of mechanism is limited in use to the more expensive vehicles. Moreover, when the headlamp is moved from the concealed position to the exposed position, the headlamp and/or the cover is located out of the plane of the adjacent panels of the vehicle resulting in an uninterrupted contour at the front end of the vehicle. Not only does this detract from the appearance of the vehicle, but also the raised cover and the headlamp can cause the vehicle to have increased drag and, as a result, a decrease in fuel efficiency.

The present invention solves the above-described problem with retractable headlamps by providing a vehicle front end arrangement wherein the headlamp system is capable of providing the appearance of having a cover which conceals the headlamp without requiring the high cost of utilizing a retraction mechanism of the type described above. This is realized by having the headlamp system located within the vehicle so that the outer surface of the lens is flush with the adjacent panel portions such as the hood and fenders and other panel portions surrounding the headlamp system. In the preferred form, the headlamp system employed in the present invention includes a housing which is closed by a colorless lens and is formed with a pair of side by side reflector cavities, one of which is adapted to project a "low beam" along a first axis and the other of which is adapted to project a "high beam" along a second axis which is inclined upwardly relative to the first axis. A plurality of vertically spaced louvres of the same color as the aforesaid panel portions of the vehicle are located in the interior of the headlamp between the two reflector cavities and the lens. The louvres located forwardly of the low beam reflector cavity are positioned in planes parallel to the first axis while the louvres located forwardly of the high beam reflector cavity are positioned in planes parallel to the second axis so as to essentially prevent the louvres from obstructing the beam of light provided by the associated reflector cavity. In addition, each of the louvres takes the form of a thin blade made of metal or high temperature plastic material coated with a paint or the like of the same color as the adjacent panel portions of the vehicle. By having a sufficient number of louvres, as deep as possible within the headlamp interior, it has been found that the crystal or colorless lens of the headlamp takes on the hue of the coated louvres and causes the headlamp to, in effect, take on the appearance of having a cover which conceals the headlamp.

So far as placing louvres between the reflector of a headlamp and its lens is concerned, this feature per se is not new, such arrangements being disclosed in the U.S. Pats. Nos. Bowman 1,493,426; Young 1,514,242; Hipp et al., 1,500,075; White 2,202,278; and Szarkowski 3,275,820. In each of these disclosures, however, the purpose for the louvres is to eliminate or reduce glare which could be objectionable to oncoming motorists and pedestrians. Moreover, in none of the headlamps in these references is the lens located flush with the adjacent panels of the motor vehicle so when the louvres are of the same color as the panels, the lens appears to be a cover concealing the headlamp. In addition, none of these references teach the use of separate "low beam" and "high beam" reflector cavities located side by side so that the louvres can be permanently positioned in planes parallel to the adjacent axes of the adjacent reflector cavity without requiring any form of tilting mechanism to accomplish this purpose.

Other U.S. patents which may be considered pertinent to the subject invention are U.S. Pat. Nos. Binder et al 4,383,290; Peck 4,525,772; and Tysoe 4,558,401. Each of these patents relate to tail lamp assemblies and not headlamps, but do incorporate louvre-type members. In each case, however, the louvres serve to prevent the color to be produced by a colored lens within the lamp from readily being perceived when the lamp is not illuminated. Also, the louvres cooperate with stripes or strips of opaque material on the outer lens for preventing the lamp from appearing to be illuminated by an outside light source such as a bright sunlight. Thus, Binder et al, Peck and Tysoe are concerned with concealing an inner colored lens and not with concealing an entire lamp unit as is the case with the present invention by having the colorless lens of a headlamp assume the same color as the color of the adjacent panels of an automobile.

To this end, the objects of the present invention are to provide a new and improved vehicle front arrangement incorporating a pair of headlamp assemblies each of which has a plurality of louvres located within the closed envelope of the headlamp between a colorless lens and a "low beam" reflector cavity and a "high beam" reflector cavity with the louvres being spaced and of a depth which causes the lens to appear to be the same color as the louvres and the adjacent panels of the vehicle; to provide a new and improved vehicle front end arrangement in which each headlamp assembly has a colorless lens covering a "low beam" reflector cavity and a "high beam" reflector cavity and has a plurality of louvres of the same color as the adjacent panels of the vehicle with the louvres in front of each of the reflector cavities being located in parallel planes which are parallel to the optical axis of the adjacent reflector cavity; to provide a new and improved headlamp assembly for the front end of a vehicle that has a colorless lens provided with vertically spaced horizontal rows of optical flutes with a louvre located in line at the horizontal separation point between such rows and with each of the louvres being of the same color as the panels of the vehicle adjacent the headlamp assembly so that the lens assumes the color of the louvres and causes the headlamp assembly to appear to be covered by a panel of the same color as the adjacent panels; and to provide a new and improved headlamp assembly having a lens the front wall of which is entirely colorless and is positioned flush with the adjacent panels at the front end of a motor vehicle and which includes horizontal louvre and vertical slot means located within the body of the headlamp assembly that are of the same color as the adjacent panels and are positioned and spaced therein so that the lens appears to be the same color as the adjacent panels.

Other object and advantages of the present invention will be more apparent from the following detailed description when taken with the drawings in which.

Figure 1:
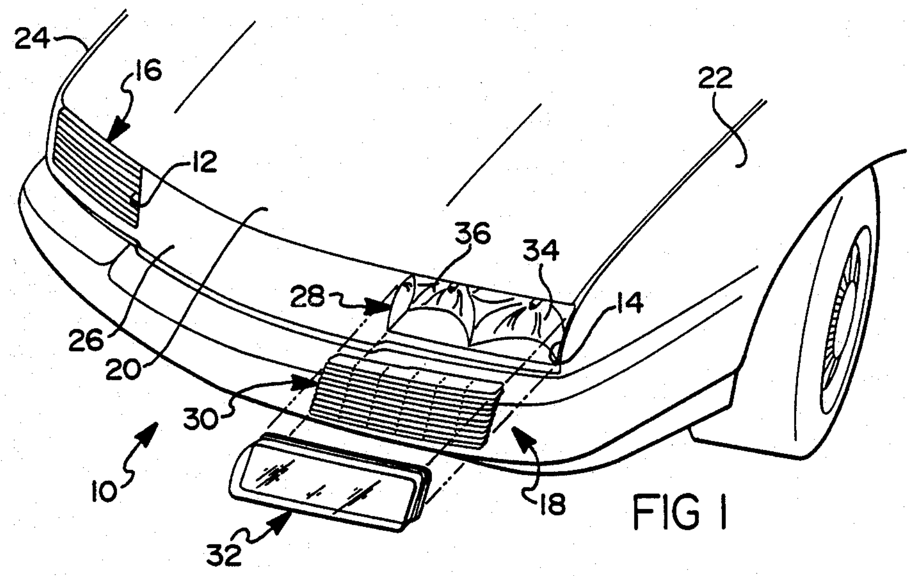
FIG. 1 is a perspective view of the front end of a vehicle incorporating a pair of headlamp assemblies and made in accordance with the present invention.

Referring now to the drawings and more particularly FIG. 1 thereof, the front end 10 of a motor vehicle made according to the invention is shown having a sheet metal body, provided with a pair of substantially rectangular openings 12 and 14 which are laterally spaced and located adjacent the opposite sides of the vehicle. The respective openings 12 and 14 are provided with substantially rectangular headlamp assemblies 16 and 18 each of which is combined with the various body portions of the vehicle such as the hood 20, left and right fenders 22 and 24 and the filler panel 26 in a manner so as to provide a flush uninterrupted appearance to improve the aerodynamics of the vehicle and lower fuel consumption.

Figure 2:
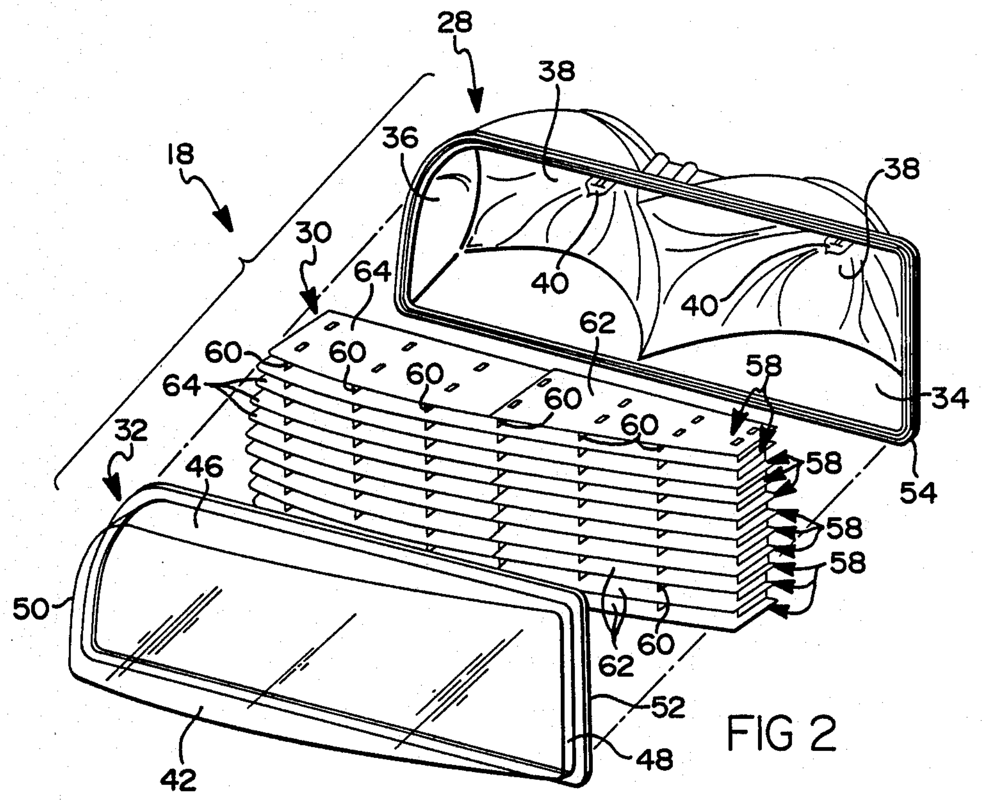
FIG. 2 is an enlarged exploded perspective view of one of the headlamp assemblies in FIG. 1 illustrating the major parts thereof.
Figures 3, 4:
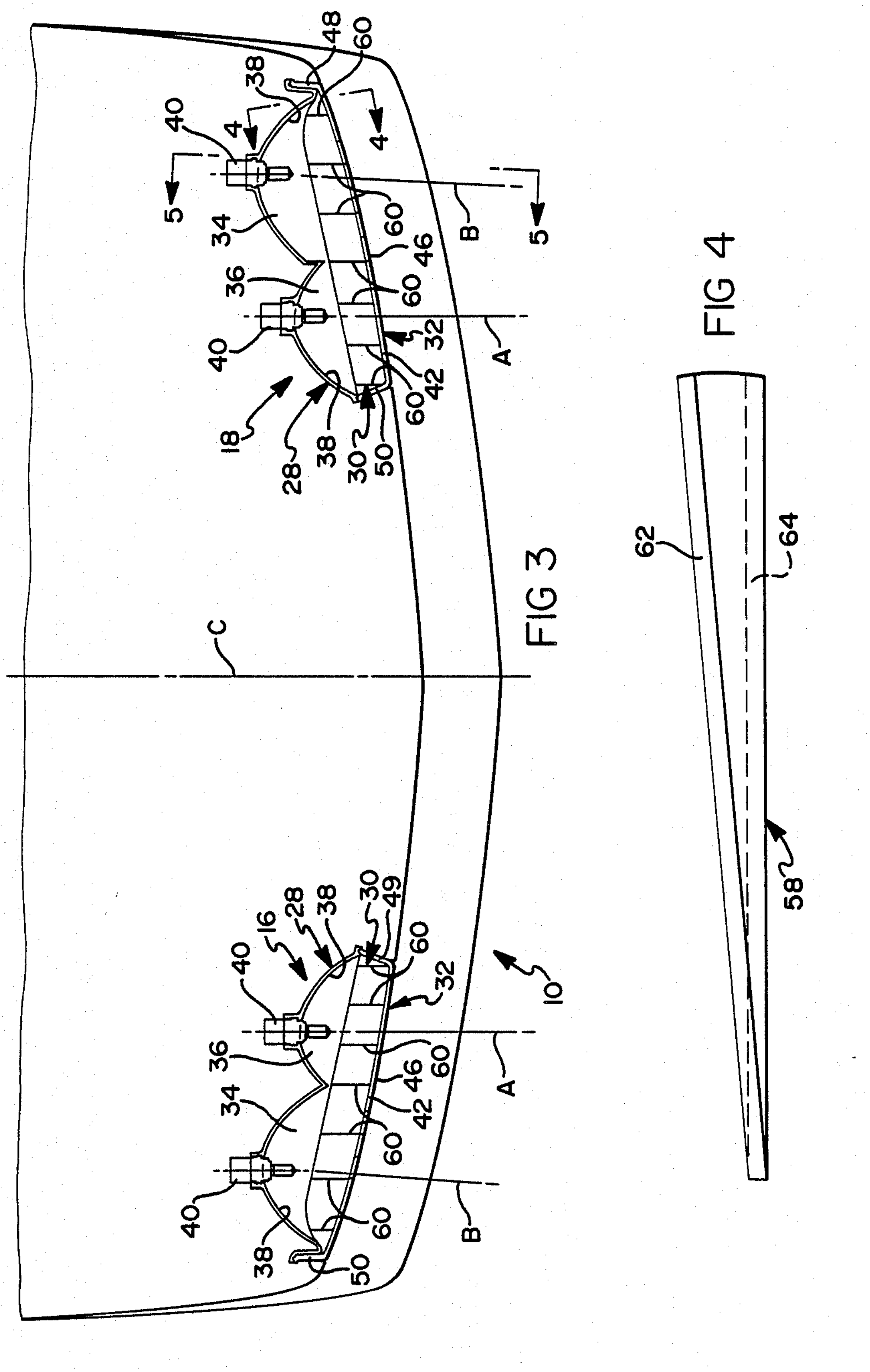
FIG. 3 is a plan view of the motor vehicle of FIG. 1 with the hood removed and showing the two headlamp assemblies sectional so as to illustrate the relationship of the parts located within each headlamp assembly.
FIG. 4 is an enlarged side elevational view of one of the louvres incorporated within a headlamp assembly and is taken on line 4—4 of FIG. 3.
Figure 5:
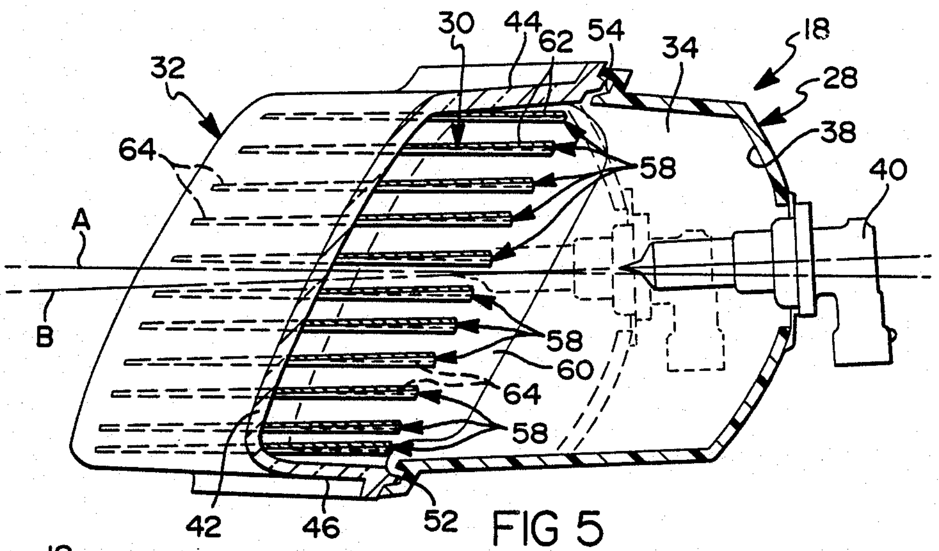
FIG. 5 is a sectional view of the aforesaid one of the headlamp assemblies taken on line 5—5 of FIG. 3.

More specifically and as seen in FIGS. 2, 3 and 5, each of the headlamp assemblies 16 and 18 is essentially a mirror image of the other except for certain differences which is to be explained hereinafter. Each headlamp assembly comprises a plastic reflector member 28, a louvre assembly 30, and a lens 32. The reflector member 28 is formed with a pair of side by side parabolic reflector cavities 34 and 36. The concave surface 38 of each of the reflector cavities 34 and 36 is aluminized so as to provide a reflecting surface which will project a light beam forwardly and substantially parallel to the optical axis of the associated reflector cavity. As shown in FIG. 3, the optical axis A of each of the reflector cavities 36 of the headlamp 16 and 18 is parallel to the longitudinal center axis C of the vehicle while each of the optical axes B of the reflector cavities 34 is tilted towards the right-hand side of the vehicle as viewed by the driver. Moreover, the angled position of each of the headlamp assemblies 16 and 18 as viewed in FIG. 3 allows the lens 32 to conform to the rounded streamlined contour of the front end design which is currently popular with motor vehicles. Also, each of the reflector cavities 34 and 36 in each of the reflector members 28 is provided with a single filament replaceable bulb 40 located so as to cause the associated aluminized parabolic surface 38 to project a light beam forwardly of the vehicle. The light bulb 40 in each of the reflector cavities 34 is located therein so that the filament thereof is positioned to allow the associated parabolic surface 38 to project the so-called "low beam" when energized while the light bulb 40 in each of the reflector cavities 36 is positioned so that the filament of the associated bulb 40 projects the so-called "high beam" when the filament thereof is energized.

Figure 6:
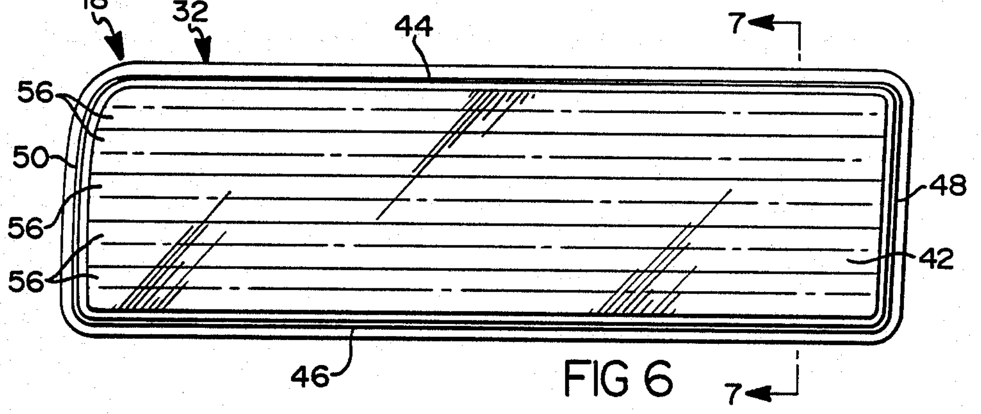
FIG. 6 is a frontal view of the lens used with each of the headlamp assemblies of FIG. 1 showing the relationship of the rows of flute segments and the louvres within a headlamp assembly.
Figure 7:
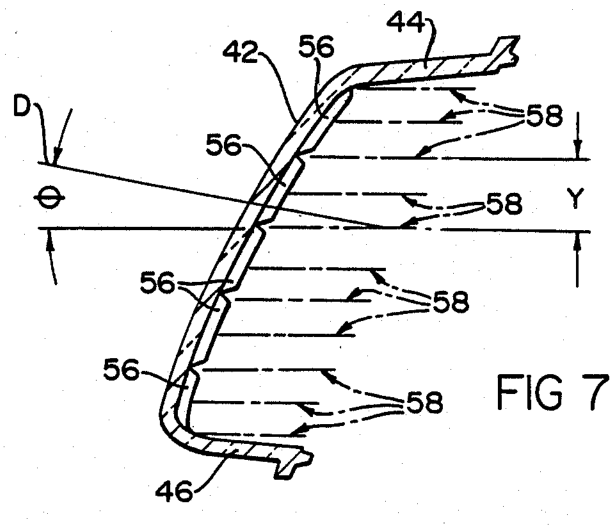
FIG. 7 is a sectional view taken on line 7—7 of FIG. 6.

The front of each reflector member 28 is closed by the lens 32 made of a colorless glass or a colorless plastic material. The lens comprises a vertically orientated front wall 42, top and bottom walls 44 and 46, respectively, and a pair of side walls 48 and 50. As is conventional, the rear marginal portion 52 of the lens 32 integral with the top and bottom walls 44 and 46 and the side walls 48 and 50 is sealingly received by a channel 54 provided around the entire margin of the front portion of the reflector member 28. The outer surface of the front wall 42 of the lens 32 is smooth, however, the inner surface is formed with five horizontally positioned rows of vertically oriented optical flute segments 56 of equal vertical length as seen in FIGS. 2, 6 and 7. The flute segments 56 serve as individual optical lenses to properly distribute and direct the light rays emanating from the associated reflector surface through the colorless front wall 42 of the lens 32, so when the bulbs 40 of the reflector cavities 34 are energized a "low beam" of light is provided so as to illuminate the road ahead of the vehicle without causing undue glare to other drivers. Accordingly, as seen in FIG. 4, it will be noted that the "low beam" reflector cavities 34 are designed so as to have the optical axis B of each tilted downwardly as seen in FIG. 5 and towards the curb side of the vehicle as seen in FIG. 3. On the other hand, when the bulbs 40 of the reflector cavities 36 are energized, the surfaces 38 of the reflector cavities 36 are designed so that the optical axis A is essentially parallel to the longitudinal center axis C of the vehicle as seen in FIG. 3 and horizontally directed as seen in FIG. 5 and thereby provides a beam of light which is primarily for distance illumination.

As seen in FIGS. 3–6, the louvre assembly 30 is located within the envelope of each of the headlamp assemblies 16 and 18 between the front wall 42 of the lens 32 and the associated reflector cavities 34 and 36. The louvre assembly 30 can be supported by the lens 32 in the position seen in FIG. 5, and if the lens 32 is made from plastic, the louvre assembly 30 can be fastened to the lens 32 by heat-staking, adhesive or through a mechanical attachment. If the lens 32 is made of glass, suitable tabs can be rigidly fixed to the upper and lower rear ends of the louvre assembly 30 and extend around rear marginal portions 52 of the lens 32 and thereby provide a support means maintaining the louvre assembly 30 in the position shown in FIGS. 3 and 5.

Each louvre assembly 30 includes a plurality of substantially horizontally orientated and parallel louvres 58 which are equally spaced vertically and are interconnected and held in fixed positions by a plurality of vertically orientated slats 60. The top surfaces of each of the louvres 58 is painted the same color as the adjacent panel portions 20, 23, 24 and 26 of the vehicle. Similarly, the opposite sides of the slats 60 are painted the same color as the adjacent panel portions 20, 22, 24, and 26 of the vehicle. The color can be black, red, white, gold, blue, silver or any other color to match the color of the aforesaid panels. The paint used for coating the louvres 58 and the slats 60 should provide a flat or matte type finish so as to avoid any light reflection which could cause objectionable glare to an oncoming vehicle. In the preferred form of the invention, the louvres 58 are vertically positioned so that one louvre 58 is located in line with the horizontal parting line between five rows of flute segments as seen in FIG. 7. Although it may not be necessary in all instances in order to practice the invention, an additional louvre can be positioned midway between the horizontal parting liens so as to provide a louvre assembly 30 as seen in FIGS. 2, 5, 6 and 7. For best results, each louvre 58 and each slat 60 should be as thin as possible while providing sufficient rigidity to maintain its configuration in a single plane and reduce to the maximum extend possible any obstruction to the light rays emanating from the aluminized surface of the associated reflector cavity. It has been found in one case that good results were realized when the louvres 58 and the slats 60 had a thickness between 0.010" and 0.020". It will also be noted that, as seen in FIG. 5, the section 62 of each of the louvres 58 in front of the "low beam" cavity reflector 34 is located in a plane that is parallel to the optical axis B of the "low beam" refelector cavity 34 so that the light rays are directed generally downwardly so as to illuminate the road ahead of the vehicle without causing undue glare to other drivers. On the other hand, the section 64 of each of the louvres 58 in front of the "high beam" cavity 36 is located in a plane that ishorizontal but inclined upwardly relative to the "low beam" optical axis B and is parallel to the optical axis A of the "high beam" reflector cavity 36. In other words, each louvre 58 is, in effect, warped having a dual angle configuration as seen in FIG. 4. As to the slats 60, each slat 60 should be positioned so as to allow the light rays emanating from the "low beam" cavity 34 to be directed towards the curb side of the vehicle. Thus, as seen in FIG. 3, the slats 60 in front of the "low beam" cavities 34 are angled slightly towards the right-hand side or curbside of the vehicle as indicated by the axes B. In addition, and as seen in FIG. 7, good simulated coloring of the lens will be obtained when the louvres 58 aligned with the horizontal parting lines of the flute segments 56 on the lens 32 and the louvre midway between the horizontal parting line, extend inwardly from the lens 32 to the reflector member at an angle of approximately 11° when each row of flute segments indicated by the letter "Y" measures approximately 0.75" and the louvres 58 are observed along a line of vision D which contacts the front edge of the midway louvre 58 and the rear edge of the lower louvre 58. Of course, as seen in FIGS. 2, 5 and 6, placing a louvre 58 midway between the louvres at the horizontal parting lines between flute segments 56 will increase the simulated coloring of the lens 32. However, as aforementioned, care must be taken not to use too many louvres which could cause a dilution of the photometric output of a headlamp assembly.

Thus from the above, it should be noted that when the headlamp assemblies 16 and 18 are viewed from a position above the lens 32, the louvre assembly 30 will cause the lens 32 to appear to be the same color as the louvres 58. Also, when the headlamp assemblies 16 and 18 are viewed from the side of the motor vehicle, the slats 60 will similarly cause the lens to appear to be the same color as the slats to the observer.

Various changes and modifications can be made in the above-described invention without departing from the spirit of the invention. Accordingly, the inventors do not wish to be limited except by the scope of the appended claims.

The embodiments of the invention in which an exclusive property or privilege is claimed are defined as follows:

1. In combination with the front end of a motor vehicle having a pair of laterally spaced openings defined by the outer panel portions of the motor vehicle, each of said openings having a headlamp assembly located therein that includes a housing closed by a colorless lens, said lens having optical flutes formed thereon, a pair of side by side first and second reflector cavities formed in said housing with said first cavity adapted to project a low beam light along a first axis and said second cavity adapted to project a high beam light along a second axis which is inclined upwardly relatively to said first axis, a plurality of blade-like louvres the top portions of which are the same color as the color of said panel portions and being located in said headlamp assembly between said first and second reflector cavities and said lens, the louvres located forwardly of said first cavity being positioned in planes parallel to said first axis and the louvres located forwardly of said second cavity being positioned in planes parallel to said second axis, and the outer surface of said lens being contiguous with the adjacent panel portions of the motor vehicle so when the headlamp assembly is not lighted the color of the louvres causes the lens to appear to the observer to be the same color as the panel portions.

2. In combination with the front end of a motor vehicle having a pair of laterally spaced openings defined by the outer panel portions of the motor vehicle, each of said openings having a headlamp assembly located therein that includes a housing closed by a lens having a front wall which is entirely colorless, said lens having optical flutes formed thereon, a pair of side by side first and second reflector cavities formed in said housing with said first cavity adapted to project a low beam light along a first axis through said front wall of said lens and said second cavity adapted to project a high beam light along a second axis which is inclined upwardly relatively to said first axis, a plurality of blade-like louvres the top portions of which are coated with a matte finish of the same color as the color of the panel portions and being located in said headlamp assembly between said first and second reflector cavities and said lens, the louvres located forwardly of said first cavity being positioned in planes parallel to said first axis and the louvres located forwardly of said second cavity being positioned in planes parallel to said second axis, and the outer surface of said front wall of said lens being contiguous with the adjacent panel portions of the motor vehicle so when the headlamp assembly is not lighted, the color of the louvres causes said entire front wall to appear to be the same color as the color of the panel portions so that the headlamp assembly is in effect concealed to the observer.

3. In combination with the front end of a motor vehicle having a pair of laterally spaced rectangular openings defined by the outer panel portions of the motor vehicle, each of said openings having a rectangular headlamp assembly located therein that includes a housing a lens having a front wall which is entirely colorless, said front wall having an outer surface which is entirely smooth and an inner surface formed with a plurality of horizontal rows of optical flutes, a pair of side by side first and second reflector cavities formed in said housing with said first reflector cavity adapted to project a low beam light along a first axis through said front wall of said lens and said second reflector cavity adapted to project a high beam light along a second axis which is inclined upwardly relatively to said first axis, a plurality of vertically spaced and horizontally extending blade-like louvres the top portions of which are coated with a matte finish of the same color as the color of the panel portions, said louvres being located in said headlamp assembly between said first and second reflector cavities and said lens, each of the louvres having a first section located forwardly of said first cavity positioned in a plane parallel to said first axis and having a second section located forwardly of said second cavity positioned in a plane parallel to said second axis, and said outer surface of said lens being contiguous with the adjacent panel portions of the motor vehicle so when the headlamp assembly is not lighted, the color of the louvres causes said entire front wall of said lens to appear to be the same color as the color of the panel portions causes the headlamp assembly is in effect concealed to the observer.

4. The headlamp assembly according to claim 3 wherein one of said plurality of louvres is located at each horizontal parting line between said rows of optical flutes.

5. The headlamp assembly according to claim 4 wherein said plurality of louvres are interconnected by a plurality of horizontally spaced and vertically orientated slats each of which is of the same color as said top portion of said louvres.

6. The headlamp assembly according to claim 5 wherein a horizontal midway louvre is located midway between each of said horizontal parting lines.

7. The headlamp assembly according to claim 6 wherein a straight line drawin from the front edge of said midway louvre to the rear edge of the adjacent louver immediately below and the plane of the latter provides an included angle of substantially 11 degrees.

8. The headlamp assembly according to claim 7 wherein the first axis of said first reflector cavity is slightly bent towards the curb side of said vehicle and each of said slats in front of said first reflector cavity are located in vertical planes parallel to said first axis.

9. In combination with the front end of a motor vehicle having a pair of laterally spaced rectangular openings defined by the outer panel portions of the motor vehicle, each of said openings having a rectangular headlamp assembly located therein that includes a housing closed by a colorless lens having a front wall, said lens having optical flutes formed on the inner surface of said front wall, said front wall having an outer surface which is entirely smooth, a reflector cavity formed in said housing and adapted to project a low beam light and a high beam light through said front wall of said lens, a plurality of vertically spaced and horizontally extending blade-like louvres the top portions of which are of the same color as the color of the adjacent panel portion, said louvres being located in said headlamp assembly between said reflector cavity and said lens, vertically orientated slats interconnecting said louvres of the same color as said louvres, and said outer surface of said lens being contiguous with the adjacent panel portions of the motor vehicle so when the headlamp assembly is not lighted and is viewed from above the lens or from the side of the motor vehicle, the color of the louvres causes said entire front wall of said lens to appear to be the same color as the color of the adjacent panel portion so that the headlamp assembly is in effect concealed to the observer.

* * * * *